Oct. 19, 1926.　　　　　　　　　　　　　　　　　1,603,364
M. TAMINI
MEANS FOR TIGHTENING THE GLANDS OF STUFFING BOXES
Filed July 16, 1921　　　2 Sheets-Sheet 1
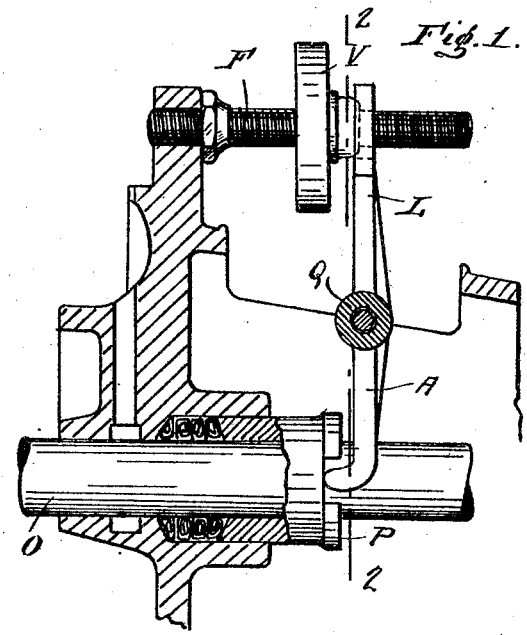
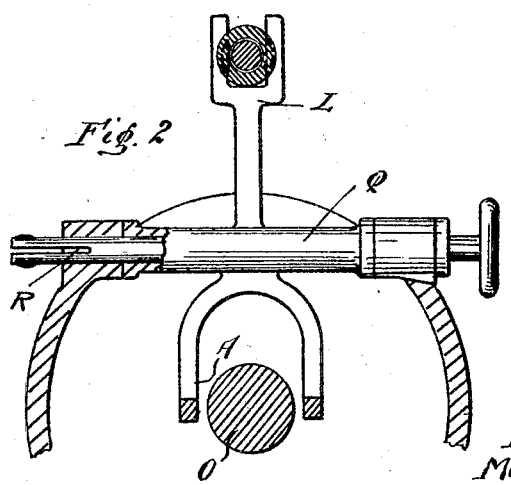
Inventor
Mario Tamini.
per
Attorney.

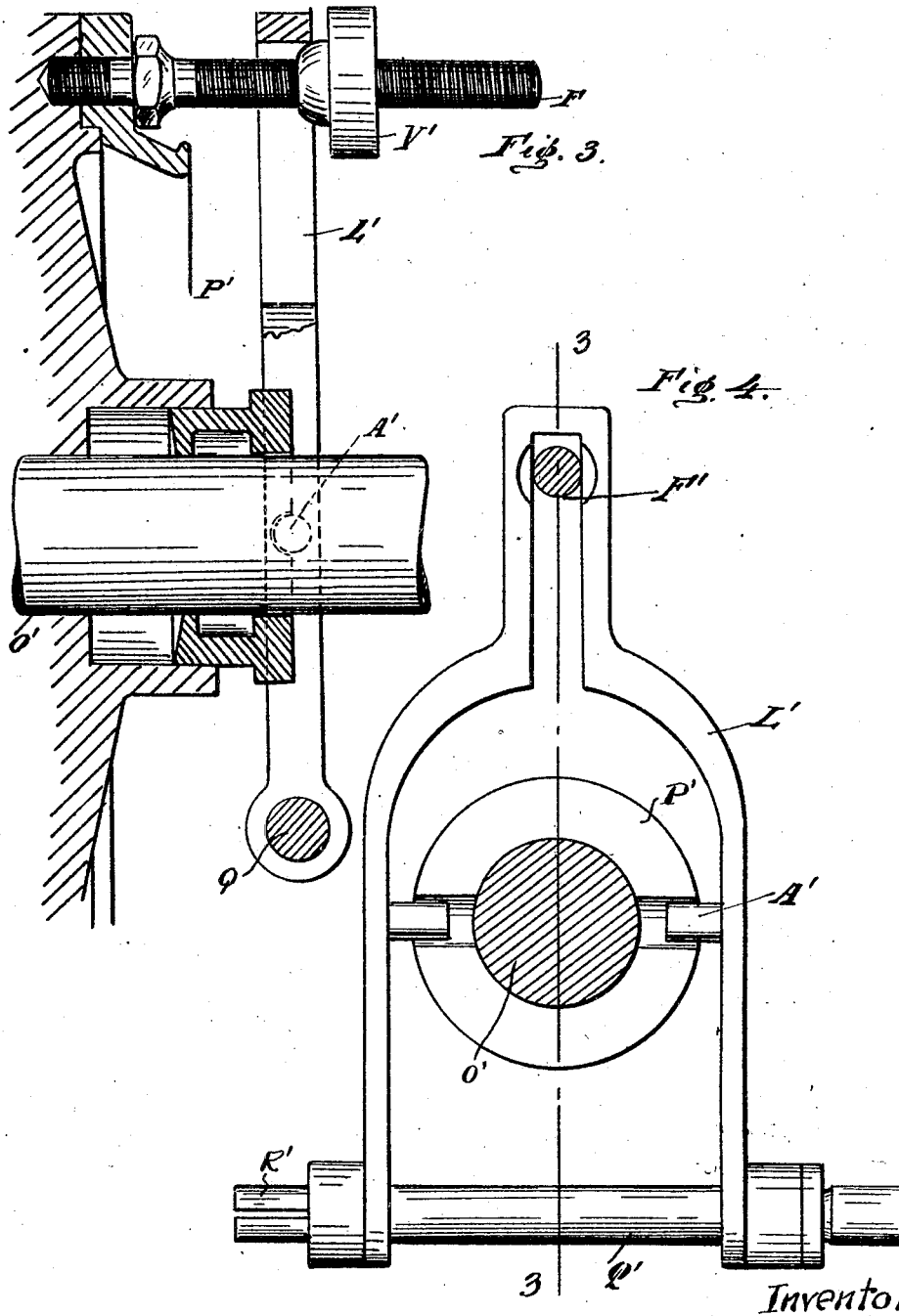

Patented Oct. 19, 1926.

1,603,364

UNITED STATES PATENT OFFICE.

MARIO TAMINI, OF MILAN, ITALY.

MEANS FOR TIGHTENING THE GLANDS OF STUFFING BOXES.

Application filed July 16, 1921, Serial No. 485,237, and in Italy February 16, 1921.

This invention relates to improved means for tightening the glands of stuffing boxes of the character commonly employed for preventing leakage along piston rods or shafts; the object of the invention being to secure the necessary tightness in the packing and to avoid the scoring or grooving of the rod or shaft, which frequently occurs as a result of the gland being tightened unevenly and thereby moved out of the true relation to the rod or shaft and its stuffing-box. As is well known, it is essential that the direction of the thrust on the stuffing-box be in a direction truly parallel with the axis of the shaft. Where the pressure for tightening the stuffing-box is imparted by means of screw bolts or by nuts and studs, they are not always tightened equally, and the simultaneous adjustment of the bolts or the screws by means of toothed wheels or by worm gear involves an expensive construction only adapted for costly structures of large dimensions.

In carrying the present invention into effect, the ordinary, simple form of stuffing-box is retained, but the dimensions of the gland flange may be reduced, whilst the truly parallel position of the gland in relation to the shaft is ensured by means which are simple in character and permit of the easy replacement of the packing and afford the utmost facility for adjustment, even whilst the rod or shaft is in motion.

In the accompanying drawings, wherein are illustrated, by way of example, two methods of carrying out my invention, Fig. 1 is a side view—partly in section—of one form of the device; Fig. 2 is a section taken on the line 2—2, Fig. 1; Fig. 3 is a part section and part side view of the second form of the device, the section being taken on the line 3—3 of Fig. 4; and Fig. 4 is an end view of the device shown at Fig. 3, but with the stud F in section.

In the construction illustrated in Figs. 1 and 2, O is a spindle or shaft, about which is mounted the stuffing-box gland P, and a lever consisting of two arms A, L is pivotally secured at a suitable point Q (Fig. 2) upon any convenient stationary part of the frame work by means of a pin or rod R. The arm A of this lever is formed with a forked end or yoke, which bears upon the gland P of the stuffing-box at two diametrically opposite points. The opposite arm L of the lever is also formed with a fork or yoke and has in one side thereof a concave or a spherical seating adapted to receive and closely engage a rounded boss on a nut V, which latter is adjustable upon the screw-threaded bolt or stud F, which passes through the fork or yoke on the arm L of the lever. It is obvious that, upon the nut V being suitably adjusted, pressure is brought to bear on the stuffing-box gland P in directions parallel to the centre line of the shaft O. The said lever may be readily detached by withdrawing the pin or rod R, so as to permit access to the stuffing-box for the inspection or replacement of the packing.

In the alternative form of construction illustrated in Figs. 3 and 4, a lever $L^1$ of the second order is of fork or yoke shape and is provided with fingers or elongated studs $A^1$, which project inwardly and bear against grooves in the stuffing-box gland $P^1$, the method of working being otherwise identical. The fulcrum $Q^1$ (Fig. 4) is at the end of the lever $L^1$ and has a pin or rod $R^1$ which passes through eyes in the lever $L^1$ and is similar to the removable pin or rod R (see Fig. 2). The opposite end of the lever $L^1$ has a slot for engagement with the screw-threaded stud F as in Figs. 1 and 2, whilst the nut $V^1$ engages the lever and may be adjusted so as to move the gland $P^1$ and tighten the packing upon the shaft $O^1$.

What I claim is:—

In a device for tightening the glands of stuffing-boxes, a forked lever engaging diametrically opposite sides of the gland, a removable pin serving as a fulcrum for the lever, a stationary screw threaded stud extending through one end of the lever, a nut adjustable along said stud, and a rounded extension on the said nut for engaging the face of the lever to swing the lever and tighten the gland.

In testimony whereof I affix my signature.

MARIO TAMINI.